United States Patent

Peacock

Patent Number: 5,480,179
Date of Patent: Jan. 2, 1996

[54] WHEELCHAIR CHASSIS

[76] Inventor: Robert T. Peacock, 54 Water Street, Foster, New South Wales, Australia

[21] Appl. No.: 154,015

[22] Filed: Nov. 16, 1993

[30] Foreign Application Priority Data

Dec. 1, 1992 [AU] Australia .................................. PL6136

[51] Int. Cl.$^6$ ...................................................... B62B 7/06
[52] U.S. Cl. ....................... 280/650; 280/657; 280/250.1; 297/DIG. 4
[58] Field of Search ...................... 280/642, 650, 280/657, 658, 250.1, 304.1; 297/378.1, DIG. 4

[56] References Cited

U.S. PATENT DOCUMENTS

| | | | |
|---|---|---|---|
| 865,541 | 9/1907 | Storm | 280/650 |
| 1,087,928 | 2/1914 | Diemer | 280/650 X |
| 3,442,532 | 5/1969 | Gardner et al. | 280/650 X |
| 4,280,716 | 7/1981 | Vonsbaek et al. | 280/650 X |
| 4,607,860 | 8/1986 | Vogel | 280/657 X |
| 4,639,012 | 1/1987 | Jensen | 280/650 X |
| 4,887,826 | 12/1989 | Kantner | 280/657 X |
| 5,292,144 | 3/1994 | Sosnoff | 280/657 X |
| 5,356,172 | 10/1994 | Levy et al. | 280/657 X |

*Primary Examiner*—Brian L. Johnson
*Attorney, Agent, or Firm*—Smith-Hill and Bedell

[57] ABSTRACT

A collapsible wheelchair has an L-shaped monocoque chassis (2), rear driving wheels (33) and front castor wheels (18). A backrest (30) is pivoted (at 44) to the rear of the chassis, and a seat (31) is pivoted (at 46) to the front of the backrest and rests on trunnions (51) locating in slots (52) in sideplates (50). The wheelchair is collapsed by lifting the seat front to raise the trunnions out of the slots and then moving the seat and backrest forwardly and downwardly so they nest in the angle of the 'L' of the chassis. The rear wheels are detachable and a footrest bracket (20) is turnable to bring the footrest (21) over the top of the stowed backrest and seat.

5 Claims, 6 Drawing Sheets

WHEELCHAIR CHASSIS

FIELD OF THE INVENTION

This invention relates to a collapsible wheelchair for use by a disabled person and is more specifically concerned with a chassis for use with such a wheelchair.

STATE OF THE ART

Non-collapsible wheelchairs are usually of welded tubular construction to provide a rigid frame which is more comfortable than a flexible frame and usually includes adjustable fittings that are bolted to it. Examples of non-collapsible adjustable wheelchairs using this form of construction are shown in U.S. Pat. No. 5,020,816 and Re-Issue No. 32,242. Hinging assemblies are avoided in the construction of these wheelchairs to enhance their lightness. Unfortunately, because of their bulk, such wheelchairs are awkward to use so that if they are to be transported, a specially adapted vehicle with a large amount of room in it is usually necessary to accommodate the wheelchair.

Collapsible wheelchairs have been developed which, although heavier than rigid wheelchairs, are less awkward to transport. They are usually constructed from tubing bent to a desired shape. Stiffness to the frame is achieved by making its sides rigid and by hinging it so that the two sides can be moved together to collapse the wheelchair. Unfortunately as the tubing used in the construction of such wheelchairs is inherently bendable, some further unwanted bending of the tubing inevitably occurs during the life of the wheelchair. This can produce fatigue cracks at the welds, and holes used in the tubing to accommodate hinging pins sometimes become slack. Such wheelchairs have a short working life and, in time, will not give the user a firm comfortable ride. Examples of folding wheelchairs having a tubular frame construction, are described in U.S. Pat. Nos. 2,896,693; 4,679,816; 4,026,568; 4,684,171; and 4,805,929.

Collapsible wheel chairs are made so that the owner can transport them more easily in or on a sedan car which nevertheless normally requires some modification to allow the collapsed wheelchair to be lifted and then carried in or on the car. The presence of a collapsed wheelchair in or on a car is apparent to an onlooker, and advertises that the driver of the car is a disabled person. This is invariably disliked intensely by the driver particularly if he is acutely sensitive to his disability.

OBJECT OF THE INVENTION

An object of the invention is to provide a simply shaped, but rigid chassis for a collapsible wheelchair

SUMMARY OF THE INVENTION

In accordance with the invention a collapsible wheelchair comprises: a rigid chassis of H-shape when viewed in plan to provide front and back horizontally-extending limbs terminating in wheel-mounting assemblies and joined at their centers by a cross-bar, the chassis having an L-shape, when viewed from its side, with the longer arm of the 'L', provided by the cross-bar, sloping downwardly and forwardly beneath the wheelchair and the shorter arm of the 'L' extending upwardly at the front of the wheelchair; a pair of coaxial driving wheels respectively detachably mounted on the mounting assemblies at the back of the wheelchair; a pair of independently-swivellable castor wheels mounted respectively on the mounting assemblies at the front of the wheelchair; a back rest; means defining a first horizontal pivot axis about which the backrest is turnable from an upright operating position on the chassis, to a stowage position at which it extends forwardly over the crossbar; a seat; means defining a second pivotal axis parallel to the first pivotal axis and about which the seat is turnable from its operating position to a stowage position at which it lies between the stowed backrest and the chassis; releasable locking means holding the backrest and seat in their operating positions with respect to the chassis such means being manually releasable to permit movement of the backrest and seat to their stowage positions; a bracket hinged to the front of the chassis to turn about a third pivotal axis parallel to the first and second pivotal axes; and a footrest mounted on the bracket and movable, by turning the bracket, from an operating position at which it extends forwardly in front of the chassis, to a stowage position at which it lies over the crossbar of the chassis.

The collapsible wheelchair of the invention allows a very compact stowage in the angle of the 'L' of the chassis, of the backrest, and seat. After detaching the rear wheels, the user can easily lift the stowed wheelchair onto a passenger seat of an unmodified car. He can then drive the car without any part of the wheelchair being visible to a casual onlooker. A second advantage is that the wheelchair can be designed so that it cannot collapse, when unoccupied, unless the locking means are deliberately released.

PREFERRED FEATURES OF THE INVENTION

The means for attaching the backrest to the back of the chassis preferably comprises a pair of parallel and identical side-plates. The first pivotal axis is suitably disposed between the chassis and the backrest, and the second pivotal axis is conveniently provided between the rear of the seat and the backrest. The releasable locking means may comprise a pair of trunnions on the underside of the seat which are engageable in upright slots provided in the side plates. The slots are preferably arcuate about the second pivotal axis in order to accommodate the trunnions with a snug fit. The trunnions can only be released from the slots to allow collapse of the wheelchair, by lifting the seat. Obviously, the weight of the user on the seat will prevent this from occurring accidentally. Once the trunnions have been released from their slots, the seat and backrest can be moved forwards to their stowage positions over the crossbar.

INTRODUCTION TO THE DRAWINGS

The invention will now be described in more detail, by way of examples, with reference to the accompanying largely diagrammatic, simplified and partly-schematic drawings, in which:

DESCRIPTION OF PREFERRED EMBODIMENT

Figure 1:
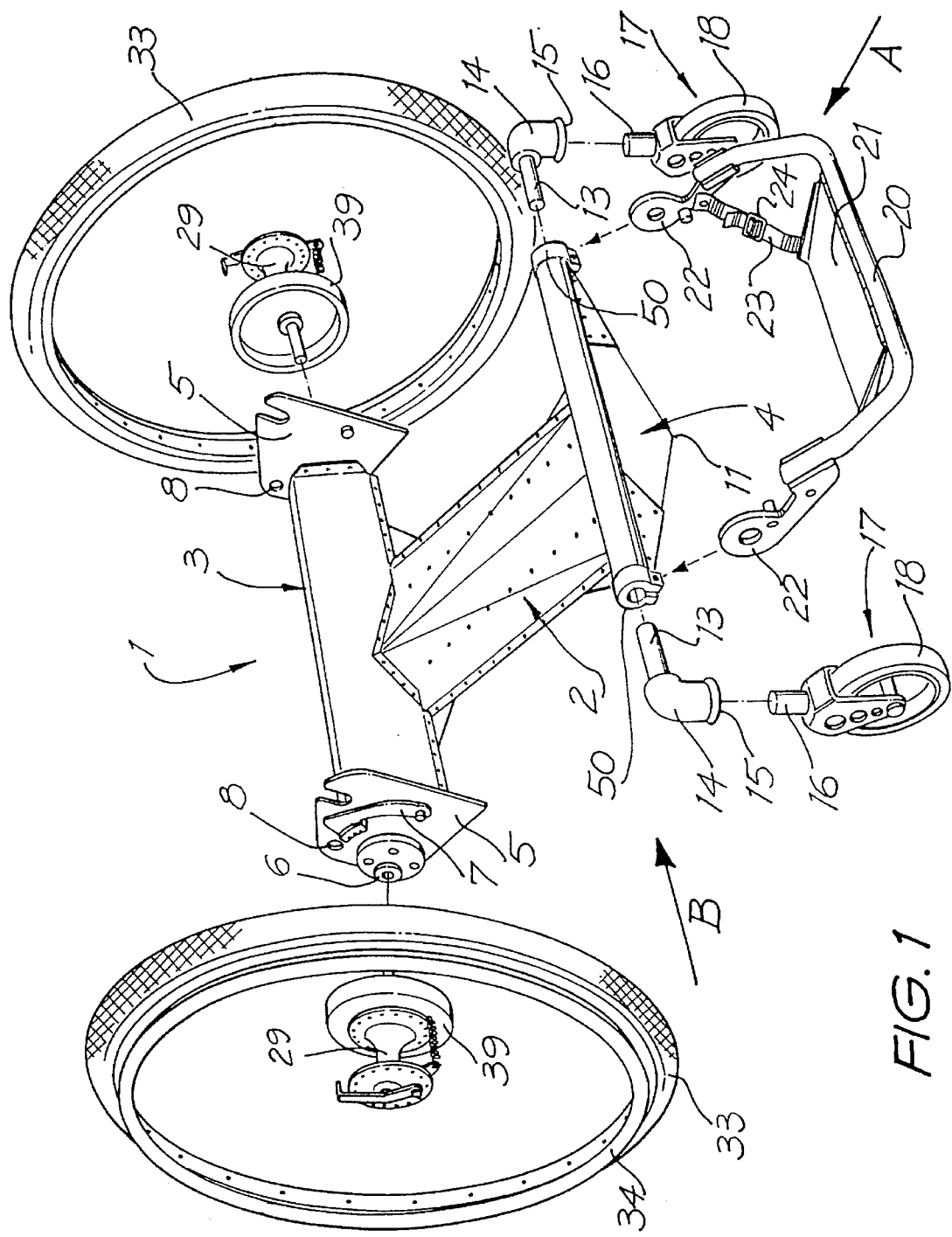
FIG. 1 is a perspective view, from above, of a wheelchair chassis with its front castor wheels and rear driving wheels and associated mounting assemblies shown in broken outline and "exploded" from the chassis.

FIG. 1 shows a wheelchair chassis 1 of monocoque construction and made from riveted aluminium sheeting so as to be very light. The chassis 1 is of H-shape when viewed in plan and has a crossbar 2 joining the centers of two side limbs 3 and 4 so that it slopes downwardly and forwardly. The crossbar 2 is of flattened oblong cross-section, being about seventeen centimeters wide and four centimeters thick. The side limb 3 is of rhomboidal cross-sectional shape and is forty-four centimeters long. The diagonal lengths of the rhomboidal cross-section are respectively about nine and ten centimeters. Each end of the limb 3 is closed by an endplate 5 providing an assembly serving as a wheel mount 6 and a rim braking mechanism 7 on its outer surface. The mounts 6 are coaxial and connected by a hollow shaft (not shown) extending through the center of the limb 3 and imparting additional rigidity to it. A pair of coaxial journals 8 provided in the upper rear portions of respective flange plates 5 provide a first pivotal axis for a back-rest assembly 30 (shown in FIG. 2).

The second limb 4 of the chassis 1 of FIG. 1 is of generally isosceles inverted triangular shape, when viewed in end-elevation and in the direction of the arrow 'A'. The triangle has an apex 11 continuous with the underside of the crossbar 2, and extends upwardly at right angles to the crossbar so as to give the chassis a generally L-shaped appearance, when viewed in side elevation in the direction of the arrow B. The longer arm of the 'L' is provided by the crossbar 2, and its shorter arm by the limb 4. The thickness of the limb 4—measured in the longitudinal direction of the crossbar 2—is about five centimeters at the apex 11 and it tapers gently to a thickness of about four centimeters at its upper rim which is semi-cylindrical. The length of the limb 4 is about thirty-eight centimeters. It is provided at opposite ends with clamping fixtures 50 which are riveted to opposite end-portions of the limb 4.

A hollow shaft (not shown) extends horizontally through the upper portion of the limb 4 to enhance its rigidity and terminates at its opposite ends in the clamping fixtures 50. These receive, at each end of the limb 4, a shank 13 of an end-piece 14 providing a socket 15 in its underside for a shaft 16 of a castor-wheel assembly 17 to enable its castor wheel 18 to swivel freely about a vertical axis. The tightening of the clamping fixtures 50 by bolts (not shown) holds the shanks 13 firmly in place in opposite ends of the limb 4.

Figure 2:
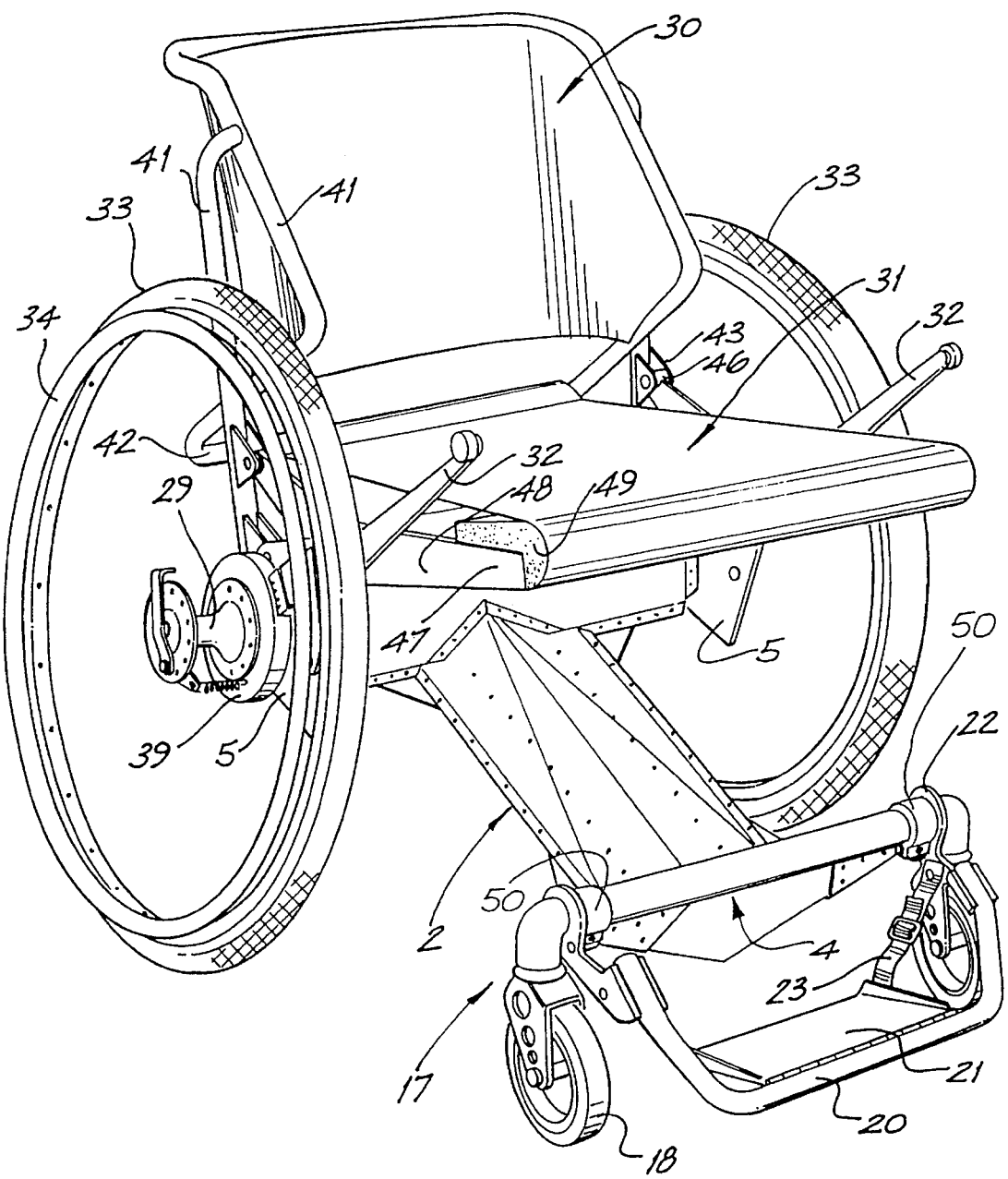
FIG. 2 is a perspective view of a collapsible wheelchair in its operating condition and incorporating the chassis of FIG. 1.

A C-shaped bracket 20 carrying a hinged footplate 21, has coaxial rings 22 at its ends which are respectively held in place at the ends of the limb 4, by being rotatably-mounted on the shanks 13 which are subsequently clamped to the limb 4 as has already been described, so that they cannot rotate. The position of the footplate 21 is adjustable on the bracket 20, by side straps 23 having buckles 24. Stops (not shown) allow the bracket 20 to be turned about the axis of the shanks 13 between an operating position at which it extends in front of the castor wheels 18 just above ground level as shown in FIG. 2, and a stowage position at which the bracket 20 overlies the crossbar 4, as is explained in more detail later.

Figure 3:
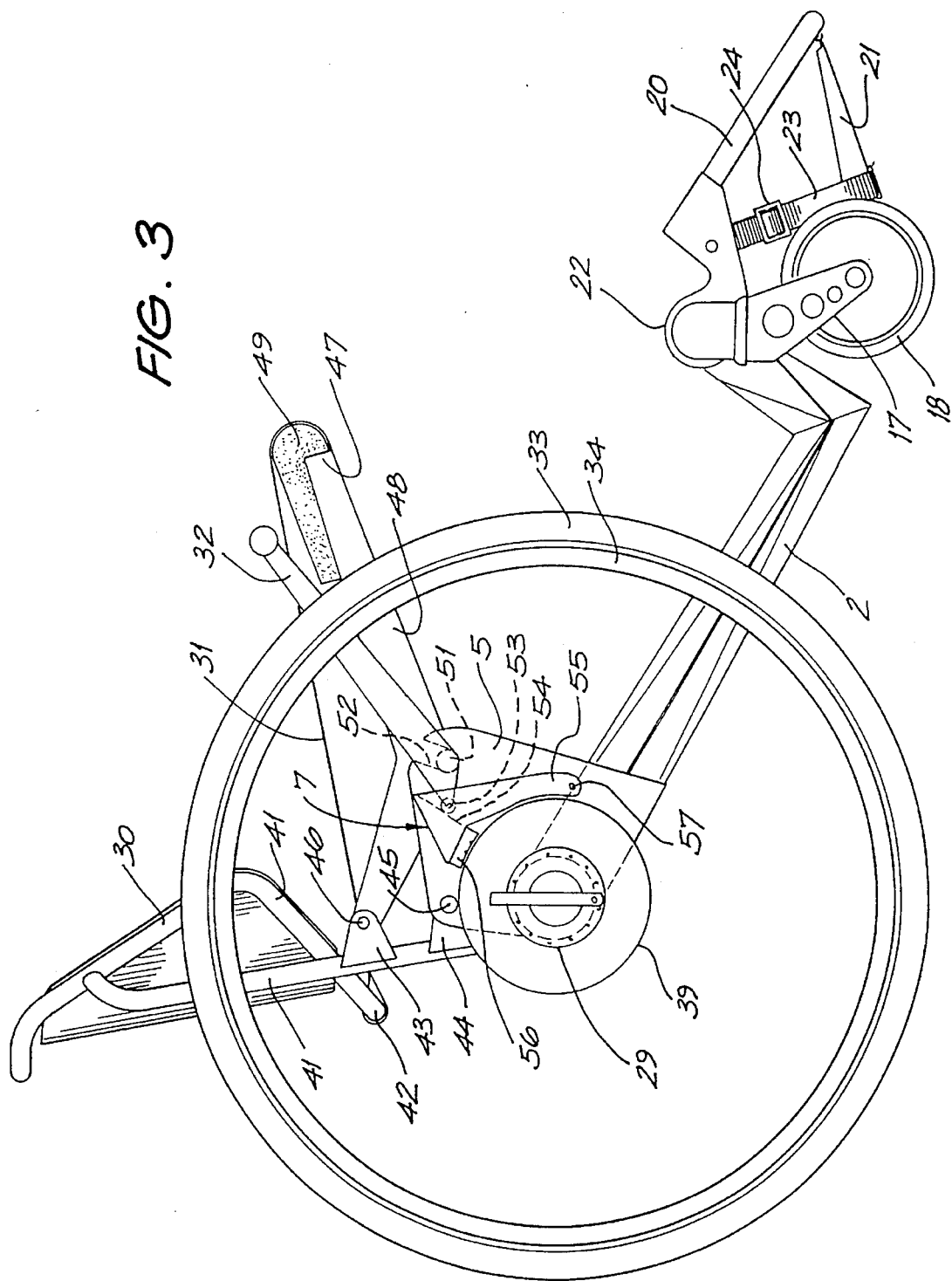
FIG. 3 shows the wheelchair in side elevation.

FIG. 3 shows the wheelchair in a simplified and diagrammatic side elevation. It has a padded backrest assembly 30 and an elasticated stretcher seat 31 extending forwardly over the crossbar 2. Brake operating handles 32 are located either side of the seat 31 to enable the user to apply the wheel brakes independently. The brakes are of currently-available rim disc type, and are respectively associated with quick-release hubs of a pair of large driving wheels 33. The rim discs 39 of the brakes are attached to the wheel hubs and each wheel has a concentric manual drive hoop 34, shown in FIG. 2, with which the user propels the wheelchair.

Figure 4:
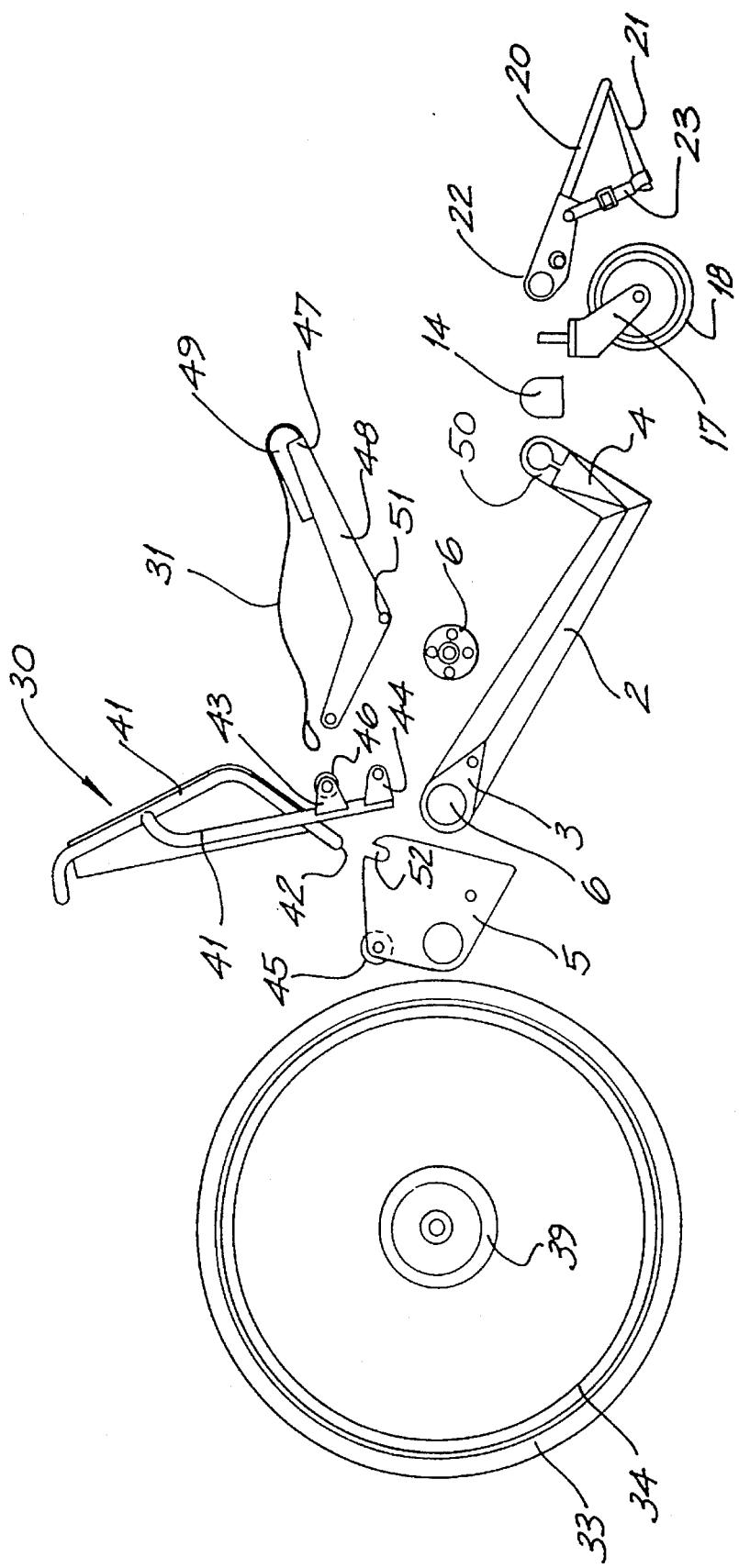
FIG. 4 is an exploded diagrammatic view of the principle parts of the wheelchair; and, FIGS. 5 to 10 respectively show, in side elevation, successive stages in the collapsing of the wheelchair from its operating condition to its collapsed condition.

FIGS. 4 shows, with more clarity, details of the construction of the wheelchair. The backrest 30 has a tubular frame providing upright side members 41 and a lower cross member 42. One of the side members at each side extends down beneath the level of the seat 31 and has two, forwardly-facing and vertically spaced lugs 43 and 44 welded to it. The lower lug 44 is connected through a journal 45 to the plate 5 to provide a first horizontal pivotal axis about which the backrest 30 can be tilted forwardly over the upper end-portion of the chassis 1. The upper lug 43 is similarly journalled at 46 to the back of the frame of the seat assembly to provide a second horizontal pivotal axis parallel to the first pivotal axis and which allows the frame of the seat to pivot upwardly with respect to the backrest 30.

The seat assembly includes a horizontally-extending front member 47 connected at its ends, respectively, to the front ends of a pair of downwardly-cranked side members 48. These are pivoted at their rear ends to the journals 46. A soft foam rubber block 49 covers the upper and front surfaces of the member 47, and the stretcher, forming the seat 31, is joined at its front end to the underside of the member 47 and, at its back end, to the horizontal member 42 of the backrest 30.

Each of the seat side-members 48 carries a trunnion 51 at the underside of its cranked portion. Each trunnion 51 can be accommodated in an upwardly opening slot 52 formed in the upper edge of the plate 5 and arcuate about the second pivotal axis. The trunnion 51 is extended beyond the side member 48 to provide a fulcrum for the brake lever handle 32, shown in FIG. 3. The rear end of the handle 32 carries a roller 53, shown in FIG. 3, which bears on a track 54. The track 54 is provided on a resiliently-biased, bell-crank lever 55 pivoted to the plate 5 at 57, and carrying a brake shoe 56 which forms part of the disc brake assembly 7 and is capable of being forced by downward movement of the handle 32 against the rim of the brake disc 39.

OPERATION OF PREFERRED EMBODIMENT

When the seat 31 is in its operating position, shown in FIG. 3, the weight of a person sitting on the seat 31 holds the trunnion 51 firmly in place in the slot 52. This fixes the operating position of the backrest 30 and the seat 31 with respect to the chassis 1 and also enables the person to apply the brakes by downward movement of respective handles 32. In use, the wheelchair is manoeuvred in the usual way by manually turning the hoops 34, and selectively applying the brakes, as needed. The castor wheel assembly 17 gives the vehicle stability while allowing it to be easily turned. The stretcher seat 31 and the backrest 30 provide a comfortable sitting posture for the user which may be altered by replacing the plates 5 with ones having differently positioned journals 45 and slots 52.

The way the parts interact with one another to enable the wheelchair to be collapsed to a very compact assembly, will be apparent from the diagrammatic and simplified FIGS. 5 to 9.

Figure 5:
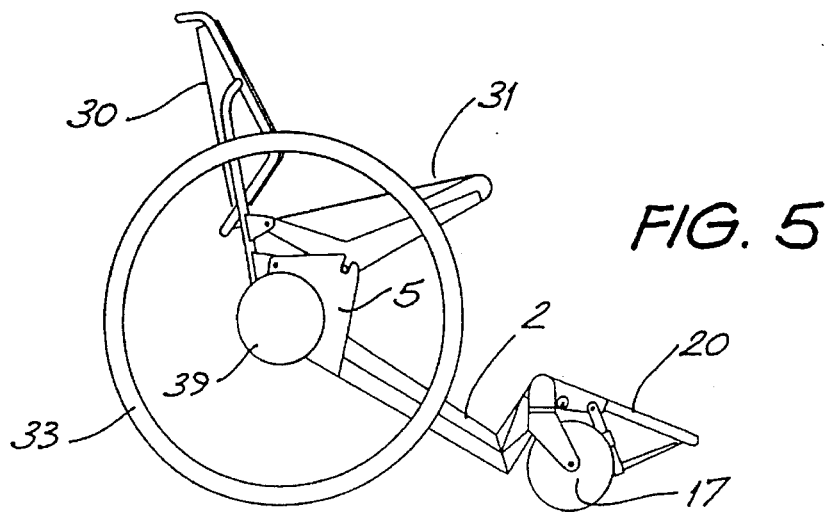

FIG. 5 shows the wheelchair in its operating position at which the plates 5 hold the seat 31 and the backrest 30 in their desired positions, and the bracket 20 is folded forwarded in front of the castor wheel assembly 17. It will be noticed that the point of contact of the castor wheels with the ground lies on the plane of the downwardly-sloping underside of the crossbar 2 of the chassis 1.

Figure 6:
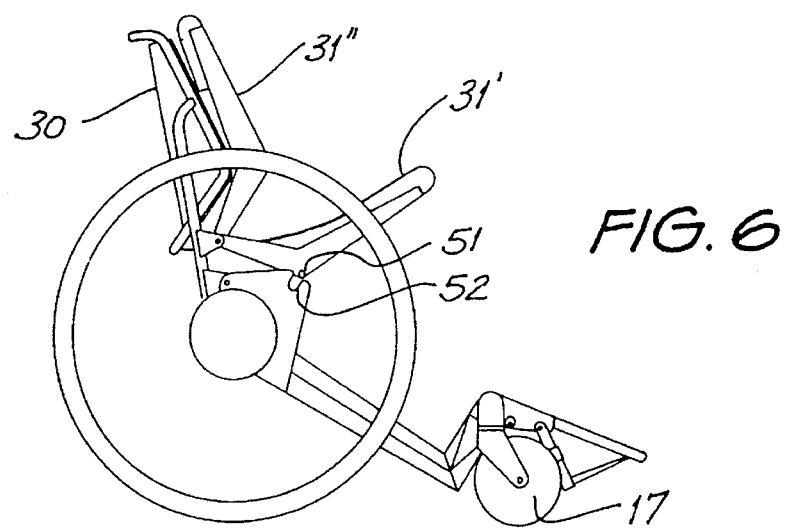
Figure 7:
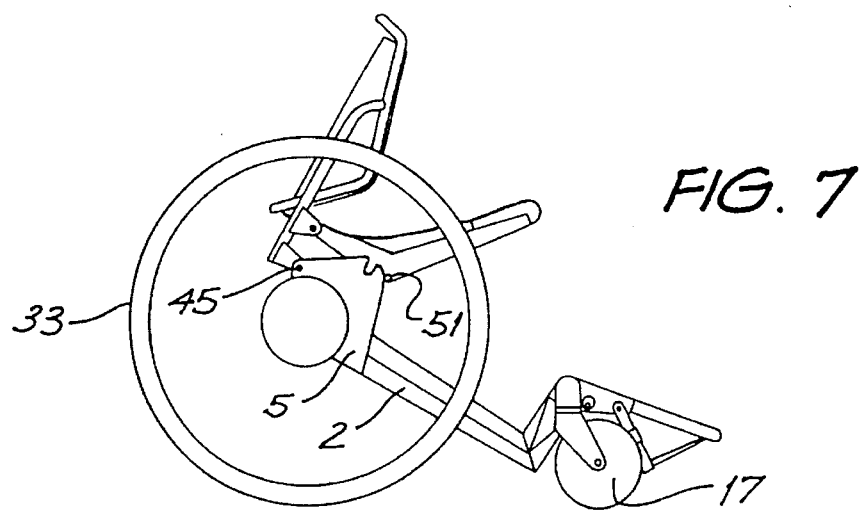
Figure 8:
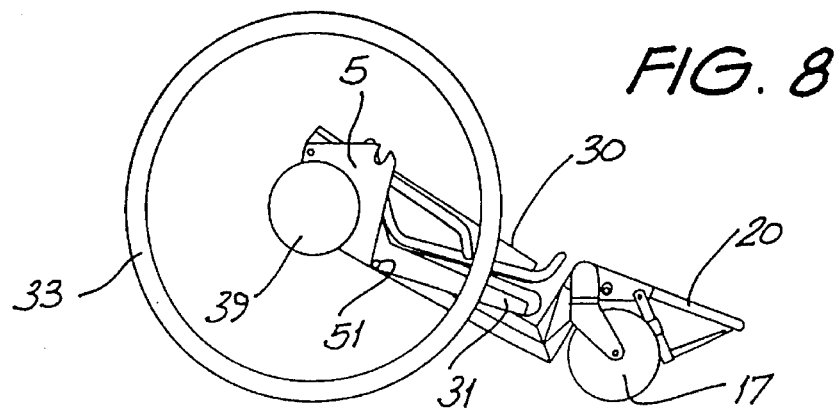

FIG. 6 shows the first stage of collapsing the wheelchair. The front end of the seat 31 is first lifted, as shown at 31', until it lies flush against the front surface of the backrest 30, as shown at 31". This lifting movement disengages the trunnions 51 from the slots 52 and frees the backrest 30 so that it can be turned forwardly about the journal 45 as shown in FIG. 7. It will be noticed from this figure that the trunnions 51 pass forwardly beyond the front edge of the plate 5 so that the seat 31 can be lowered to rest on the upper surface of the crossbar 2, with the backrest 30 folded down on top of it, as shown in FIG. 8. A very compact stowage is achieved because the backrest and seat nest neatly in the angle of the crossbar 2 immediately behind the upright triangular side limb 4.

Figure 9:
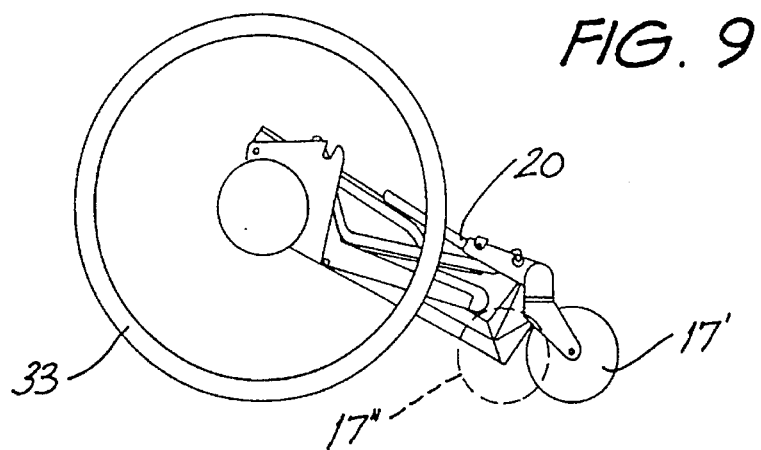

The bracket 20 carrying the footplate 21 is now hinged upwardly and backwardly, as shown in FIG. 9, so that the footplate and bracket also lie over the backrest. Clips (not shown) are provided on the rear surface of the backrest and are engaged by the bracket 20 so that it is retained in this during transportation so that the length of the collapsed wheelchair is foreshortened.

Figure 10:
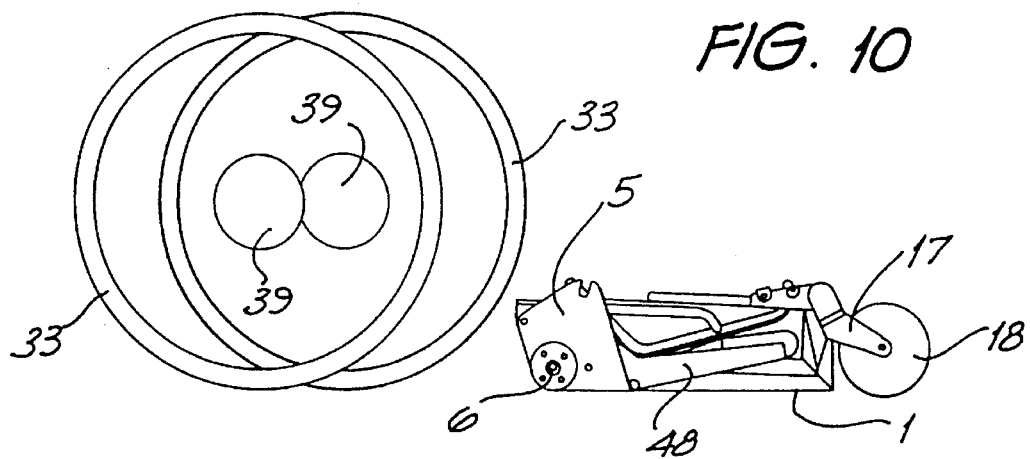

Finally the hubs of the driving wheels 33 are individually separated from their mounts 6 on the chassis by means well-known in the art. The back of the collapsed wheelchair, which now has the shape shown in FIG. 10, is lowered to the ground and rests on the undersurface of the crossbar 2 and the front castor wheels 18. The castor wheel assemblies can then be turned from the position shown at 17' in FIG. 9, to the broken outline position shown at 17", to foreshorten the collapsed wheelchair still further. The shape of the wheelchair in the collapsed condition is that of a parallelepiped of about fifty-four centimeters in length, eighteen centimeters in height, and about fifty centimeters in width. The radius of the driving wheels is thirty centimeters. The weight of the wheelchair chassis is eight kilos, and the driving wheels each weigh two and one-half kilos.

It will be appreciated that: the wheelchair dimensions and those of the detached wheels are such that they can be lifted individually and with one hand, by a disabled person sitting in the driving seat of a car and leaning over the empty passenger seat. The detached wheels can first be placed in the leg bay in front of the passenger seat and the collapsed body of the wheelchair can then be placed on the passenger seat. There are then no parts of the wheelchair visible to a casual onlooker from outside the car, once the car-door has been closed.

One advantage of the wheelchair chassis described, is that its rigidity enables the brake-operating handles of disc brakes to be fulcrumreed to it. Disc brakes have the advantage that they can be designed so that they prevent the wheel chair from rolling backwards, while allowing the user to propel it forwards. Enhanced safety to the user is thereby achieved.

A second advantage of the wheelchair chassis described is that it is free of bars or tubes running from the user's knee's to his feet at the sides of the wheelchair. This allows closer access of the wheelchair to facilities such as toilet pedestals to which the user may wish to transfer himself. This advantage is of major benefit to the wheelchair user.

VARIATIONS OF THE PREFERRED EMBODIMENT

The monocoque construction of the wheelchair chassis described not only gives it rigidity but also a shape which enables it to be used with virtually any shape of seat and backrest which can be bolted or welded to the chassis, or firmly secured to it by a hinging assembly such as a piano hinge. Thus the chassis can be used to provide an office chair, or a shape of chair which matches others which the user may have in his home.

I claim:

1. A collapsible wheelchair, comprising:

a monocoque chassis of H-shaped plan view providing spaced front and back horizontal limbs each having a center and two opposite extremities, and a crossbar connecting the centers of said limbs, said chassis having an L-shaped side view, the 'L' having a longer arm and a shorter arm with said crossbar and back limb lying in the longer arm of the 'L' and the shorter arm of the 'L' being formed by the front limb;

a pair of castor wheels;

first mounting means for mounting the castor wheels at the front of said chassis at the opposite extremities respectively of the front limb;

a pair of driving wheels ;

second mounting means for detachably mounting the driving wheels in coaxial relationship at the opposite extremities respectively of the back limb;

backrest;

means defining a first horizontal pivot axis at the back of said chassis and about which said backrest is turnable from an upright operating position to a stowage position at which it extends forwardly over the crossbar;

a seat having an operating position overlying said crossbar;

means on the backrest defining a second pivotal axis parallel to the first pivotal backrest defining a second pivotal axis parallel to the first pivotal axis, said seat being turnable about said second pivotal axis from the operating position to a stowage position at which the seat lies between the stowed backrest and the chassis;

manually-releasable locking means for retaining the backrest and seat in the operating positions and releasable to permit movement the backrest and seat to the stowage positions;

a bracket hinged to the front of the chassis to turn about a third pivotal axis parallel to the first and second pivotal axes; and a footrest mounted on the bracket and movable, by turning the bracket, from an operating position at which it extends forwardly in front of the chassis, to a stowage position at which it lies over the crossbar of the chassis.

2. A wheelchair as claimed in claim 1 in which the second pivotal axis is above a horizontal plane continuing the first pivotal axis.

3. A wheelchair as claimed in claim 2, wherein the extremities of the back limb have respective forwardly-extending side plates lying in parallel vertical planes with vertically-opening blind slots formed in upper edge-portions thereof, and trunnions in the underside of said seat releasably engaged in said slots to provide said releasable locking means.

4. A wheelchair as claimed in claim 3, in which said trunnions locate in front of the side plates when the seat is in the stowage position, and said blind slots are arcuate about said second axis.

5. A wheelchair as claimed in claim 1, including brake handles pivoted to respective sides of said chassis along side said seat and forming operating parts of disc braking means to selectively brake said driving wheels.

* * * * *